United States Patent [19]

Cheng et al.

[11] Patent Number: 4,743,753

[45] Date of Patent: May 10, 1988

[54] METHOD AND APPARATUS FOR CARRYING OUT FIBER OPTIC TIME DOMAIN REFLECTOMERY WHEREIN GOLAY COMPLEMENTARY SEQUENCES ARE APPLIED

[75] Inventors: John Cheng, Portland; Jeffrey H. Goll, Lake Oswego; J. Nelson Edwards, Bend, all of Oreg.

[73] Assignee: Tektronix, Inc., Beaverton, Oreg.

[21] Appl. No.: 903,916

[22] Filed: Sep. 5, 1986

[51] Int. Cl.$^4$ ............................................. G01N 21/00
[52] U.S. Cl. ..................................... 250/227; 356/73.1
[58] Field of Search .......................... 356/73.1; 371/70; 364/819, 826; 370/18, 32, 92; 324/532–535, 58 B, 58.5 B; 250/227

[56] References Cited

U.S. PATENT DOCUMENTS 4,041,381 8/1977 Hwa ..................................... 324/533
4,645,884 2/1987 Barazeche et al. .................... 370/32

OTHER PUBLICATIONS

Okada, et al., "Optical Cable Fault Location Using Correlation Technique", 7/31/80, vol. 16, No. 16, pp. 629, 630, Electronics Letters Primary Examiner—David C. Nelms
Assistant Examiner—William L. Oen
Attorney, Agent, or Firm—John Smith-Hill; Robert S. Hulse

[57] ABSTRACT

A measurement is carried out on a medium that propagates energy in a selected form by applying energy in the selected form to the medium, the power varying as a function of time in accordance with the elements of two Golay complementary sequences where one kind of element is represented by zero power and the other kind of element is represented by a predetermined non-zero power level and the successive elements of each sequence are applied at uniform intervals. Energy emitted from the medium in the selected form is received, and the variation as a function of time of the power emitted is correlated with the variation as a function of time of the power that was applied. Preferably, the level at which power is applied is varied both directly, in accordance with the elements of the two Golay complementary sequences, and in a derivative fashion, in accordance with the logical complements of the two Golay complementary sequences.

7 Claims, 1 Drawing Sheet

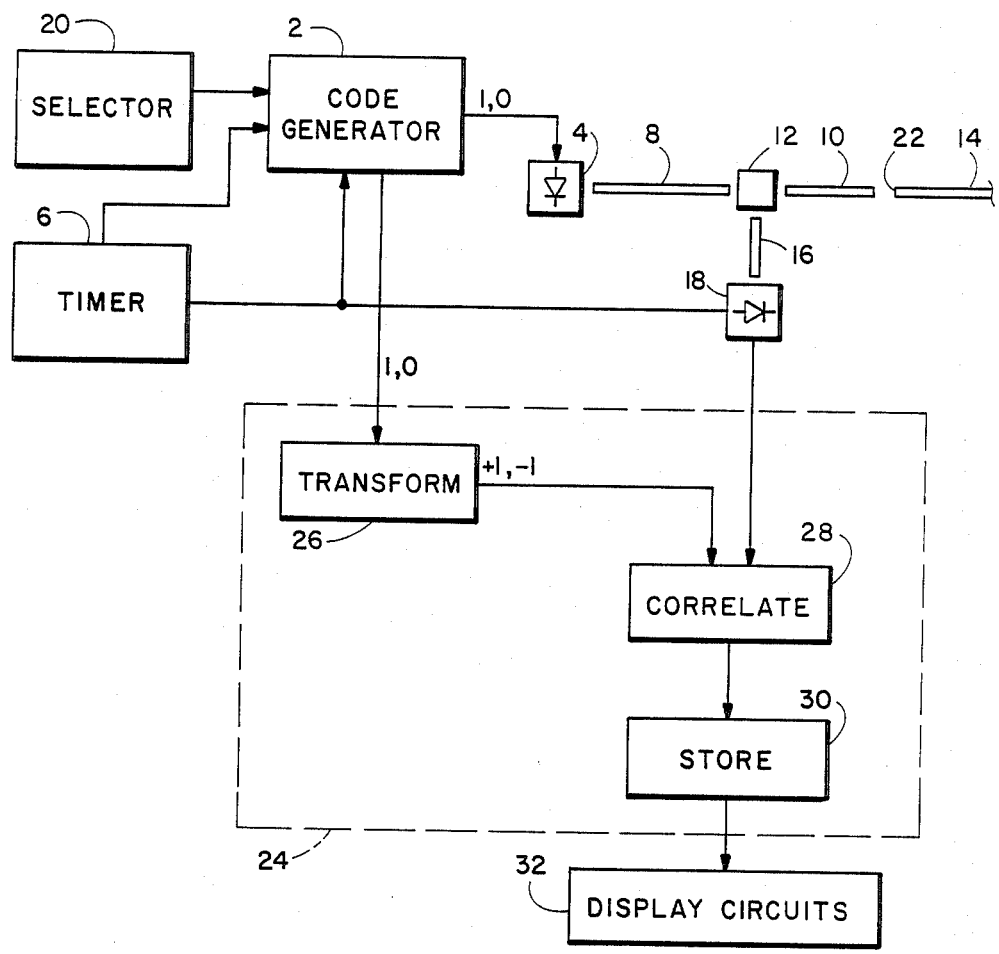

METHOD AND APPARATUS FOR CARRYING OUT FIBER OPTIC TIME DOMAIN REFLECTOMERY WHEREIN GOLAY COMPLEMENTARY SEQUENCES ARE APPLIED

This invention relates to a method and apparatus for carrying out time domain reflectometry. Although the invention will be described in its application to fiber optic time domain reflectometry, the invention is also applicable to other pulse-echo measurement techniques.

BACKGROUND OF THE INVENTION

In a fiber optic time domain reflectometer (FOTDR), a pulse of light is launched into one end of a fiber under test at time $t=0$ and the optical power level leaving the test fiber by way of the same end after a delay T is detected using a photodetector. This power level is representative of the condition of the fiber at a distance $vT/2$ from the light source and the photodetector (where v is the velocity of light in the fiber). The operations of launching a pulse into the fiber and detecting the optical power level leaving the fiber are repeated for a large number of different delay values, and the resulting data is used to form a display that represents fiber condition as a function of distance.

Conventional FOTDR's use laser diodes to generate the desired light pulses. The range of an FOTDR depends on the amount of energy that is launched into the fiber. The laser diodes of conventional FOTDR's are operated at maximum power level, and therefore in order to increase the range of an FOTDR it is necessary to increase the time for which the laser diode is energized. However, if one simply increases the duration of the light pulse, the resolution of the FOTDR is reduced. Therefore, it has been proposed that a sequence of light pulses should be launched into the fiber and that the power level at which light leaves the fiber should be correlated with that sequence. This technique contemplates applying an electrical signal comprising a sequence of pulses, each of which may be 1 (on) or 0 (off), to the laser diode and thereby launching a corresponding sequence of light pulses into the fiber, and generating a display of the condition of the fiber as a function of distance by correlating a delayed replica of the electrical signal with the output signal of the photodetector, which represents the optical power level leaving the fiber. In P. Healey, "Optical Orthogonal Pulse Compression Codes by Hopping", *Electron. Lett.*, 1981, vol. 17, p. 970, it is reported that the electrical signal can be encoded in accordance with maximal length sequences (M-sequences), and that the optical power level leaving the fiber can be correlated with the delayed replica of the electrical signal using a special technique which yields a correlation function that is zero for all values of relative delay (the difference between the delay suffered due to propagation through the fiber and the delay imposed on the replica of the electrical signal) except zero, and for zero relative delay is dependent on the number of terms in the sequence. Thus, if there is a discontinuity in the fiber at distance $v\tau_0/2$, giving rise to a reflection that is received at time $\tau_0$ after launching energy into the fiber, and a delayed replica of the electrical signal is correlated with the power level at which light leaves the fiber, the correlation function will be zero for values of delay other than $\tau_0$. The resolution of the measurement is limited by the duration of each pulse in the sequence rather than by the duration of the sequence. However, the technique described by Healey is subject to the disadvantage that it requires that N sequences of light pulses be transmitted into the fiber and that the power level leaving the fiber be correlated twice for each of the transmitted sequences, where N is the number of elements in the M-sequence.

M. J. E. Golay "Complementary Series" *IRE Trans. on Information Theory*, 1961, IT-7, p. 82, describes the properties of certain sequences. Golay uses the term "series" to describe what is commonly known as a sequence and therefore the latter term will be used in this specification. The sequences referred to by Golay as complementary series will be referred to in this specification as Golay complementary sequences. A set of Golay complementary sequences may be defined as a pair of equally long, finite sequences of two kinds of elements which have the property that the number of pairs of like elements with any given separation in one sequence is equal to the number of pairs of unlike elements with the same separation in the other sequence. Golay discusses the application of the properties of Golay complementary sequences to multislit spectrometry, and points out that the use in a multislit spectrometer of slits that are open or closed in accordance with whether the corresponding elements of a group of Golay complementary sequences are of one kind or the other yields improved signal to noise ratio and resolution.

For the general case, Golay assigns values of 1 and 0 to the two kinds of elements of Golay complementary sequences, although he points out that if values of $+1$ and $-1$ are assigned then the sum of the autocorrelation functions of the two Golay complementary sequences has zero sidelobes. Thus, if two Golay complementary sequences having elements $+1$ and $-1$ are designated by a and b respectively, and the autocorrelation functions for the sequences a and b are designated by $c_j$ and $d_j$ respectively, where j indicates the separation of the sequences that are correlated, then $$c_j + d_j = 0 \quad j \neq 0 \tag{1}$$

$$c_o + d_o = 2n \tag{2}$$

Healey apparently recognized the possibility and advantage of using Golay complementary sequences where positive and negative values are available for the two kinds of elements of the sequences, but believed that the properties of Golay complementary sequences could not be used when only non-negative values are available.

SUMMARY OF THE INVENTION

A preferred method of carrying out a measurement on a medium that propagates energy in a selected form comprises applying energy in the selected form to the medium, the power varying as a function of time in accordance with the elements of two Golay complementary sequences where one kind of element is represented by zero power and the other kind of element is represented by a predetermined non-zero power level and the successive elements of each sequence are applied at uniform intervals. Energy emitted from the medium in the selected form is received, and the variation as a function of time of the power emitted is correlated with the variation as a function of time of the power which was applied.

It is preferred that the power be varied both directly, in accordance with the elements of the two Golay complementary sequences, and in a derivative fashion, in accordance with the logical complements of the two Golay complementary sequences. The "logical complement" of a sequence of binary elements is derived by replacing each element of one kind in the first sequence by an element of the other kind and each element of said other kind in the first sequence by an element of said one kind.

BRIEF DESCRIPTION OF THE DRAWING

For a better understanding of the invention, and to show how the same may be carried into effect, reference will now be made, by way of example, to the accompanying drawing which illustrates a simplified block diagram of an FOTDR embodying the present invention.

DETAILED DESCRIPTION

The FOTDR shown in the drawing comprises a code generator 2 which generates an electrical signal, having a predetermined sequence of n binary elements 1, 0, in response to a start pulse received from a timer 6 at time t=0. Each binary element is of duration $t_e$, and the entire sequence is of duration $t_p(=nt_e)$. For the sake of clarity, the invention will be described for the case for n=4, although in a practical implementation of the invention n would normally be much larger, and may be 1000 or more. The signal generated by the code generator 2 is applied to an optical source 4. The optical source 4, which includes a laser diode, responds to the sequence of binary elements by generating an optical signal having a duration $t_p$. The power level of the optical signal at a given time within the interval $t_p$ depends upon the level of the electrical signal received from the code generator 2: if the electrical signal is at level 1, the optical pulse has a predetermined non-zero power level and if the electrical signal is at level 0 the optical pulse has a second power level. For the purpose of this description, the second power level will be assumed to be zero.

Optical energy emitted by the source 4 is transmitted through optical fibers 8 and 10 and a coupler 12 and is coupled into a fiber under test 14 by way of its proximal end face 22. A portion of the energy emitted into the test fiber 14 is scattered back towards the proximal end face 22 and is transmitted through the fibers 14 and 10, the coupler 12, and a fiber 16 to an optical detector 18, e.g., a photodiode. The detector 18 generates an electrical output signal of which the voltage is related in substantially linear fashion to the power incident on the detector. This electrical output signal is applied to a signal processing circuit 24.

At time T, the timer 6 causes the code generator 2 to generate a signal, containing the same sequence of binary elements as the signal applied to the source 4, and apply this signal to the processing circuit 24. The signal processing circuit 24 includes a transformation block 26 which receives the sequence of 1's and 0's from the code generator and generates a derivative sequence in response thereto. Preferably, the derivative sequence generated by the transformation block 26 in response to the sequence of 1's and 0's generated by the code generator 2 is a sequence of +1's and −1's, such that for every 1 in the sequence generated by the code generator 2 the transformation block generates a +1 and for every 0 generated by the code generator 2 the transformation block generates a −1. The two signals received from the transformation block 26 and the detector 18 are correlated in a correlation block 28.

The code generator 2 is programmed so that the sequence of binary elements that it generates in response to the start pulse is one of four possible sequences, and a code selector 20 is connected to the code generator 2 to select which sequence of the four is to be generated. The four sequences that are generated by the code generator 2 are two Golay complementary sequences and their logical complements. For each value of T, the operations of generating the selected sequence, energizing the source 4, and correlating the output signal of the detector 18 with the output signal of the transformation block 26 are carried out four times, using the four sequences respectively. As each correlation is performed, the result of the correlation, which is the correlation function for the output signal of the detector 18 and the output signal of the transformation block for that value of T, is written into a memory 30, and when all four correlations have been performed the sum of all four correlation functions is formed and is provided to the display circuits 32 of the FOTDR. It is of course possible to carry out more than one correlation between launching consecutive optical signals into the fiber 14, provided that the duration of the electrical signal generated by the code generator 2 is less than the time taken for the optical signal to travel from the source 4 to the distal end of the fiber and back to the detector 18.

If the Golay complementary sequences of 1's and 0's generated by the code generator 2 are represented by A and B respectively, and their logical complements by A' and B', then the optical power incident upon the photodetector due to light scattered from a given location in the fiber 14 will be proportional to the sequences A, B, A' and B'. The sequences of +1's and −1's generated by the transformation block in response to the sequences A, B, A' and B' of 1's and 0's received from the code generator may be represented by a, b, a' and b' respectively. It will be seen that $A_i=(1+a_i)/2$, $B_i=(1+b_i)/2$, $a_i=-a_i'$ and $b_i=-b_i'$, where the subscript i denotes the ith member of the relevant sequence. Therefore, when all four correlation functions are added we obtain:

$$A*a + A'*a' + B*b + B'*b' = [(1 + a)*a +$$

$$(1 + a')*a' (1 + b)*b + (1 + b')*b']/2 = [a*a + b*b]$$

where * represents correlation and 1 represents a sequence of the same length as A and B but having all 1's. It follows from equations (1) and (2) that the sum of the correlation functions is equal to zero for $T \neq \tau$ and is equal to 2n for $T = \tau$. Accordingly, by transmitting not only the Golay complementary optical codes A and B but also their logical complements A' and B', and correlating the optical codes with their counterpart codes of +1's and −1's, correlation functions with zero sidelobes are obtained.

Tables 1 and 2 illustrate by way of example the results that are obtained when the optical signals that are launched into the fiber 14 are encoded in accordance with a pair of four-term Golay complementary sequences (1000 and 0010) and their logical complements (0111 and 1101). In Table 1, the left side represents the power transmitted into the test fiber by the source 4, and received from the fiber by the detector 18 due to scattering within the test fiber. The right side of Table 1 illustrates the codes with which the signals representing the level of received optical power are respectively correlated. The upper four rows of Table 2 illustrate the correlation functions yielded by the correlations indicated in Table 1 for different values of T in the range from $\tau-3t_e$ to $\tau+3t_e$. The bottom row of Table 2, which shows the sum of the four correlation functions for each value of T, confirms that the sum of the four correlation functions is equal to zero for $T \neq \tau$ and to eight units (2n) for $T=\tau$. It will, of course, be appreciated that the output of the processing circuit 24 will not be equal to 2n for $T=\tau$ but will be reduced due to attenuation in the fiber. However, the correlation functions still have zero sidelobes.

TABLE 1

| 1 | 0 | 0 | 0 | * | 1  | -1 | -1 | -1 |
|---|---|---|---|---|----|----|----|----|
| 0 | 1 | 1 | 1 | * | -1 | 1  | 1  | 1  |
| 0 | 0 | 1 | 0 | * | -1 | -1 | 1  | -1 |
| 1 | 1 | 0 | 1 | * | 1  | 1  | -1 | 1  |

TABLE 2

| -1 | -1 | -1 | 1 | 0  | 0  | 0  |
|----|----|----|---|----|----|----|
| 0  | 1  | 2  | 3 | 1  | 0  | -1 |
| 0  | 0  | -1 | 1 | -1 | -1 | 0  |
| 1  | 0  | 0  | 3 | 0  | 1  | 1  |
| 0  | 0  | 0  | 8 | 0  | 0  | 0  |

The detector is a substantially linear device over its range of operation, and this enables the processing circuit to discriminate between energy reflected from two locations that are spaced apart in the fiber by a distance less than $vt_p$, provided that the distance is greater than $vt_e$, even though receipt of energy from one location overlaps receipt of energy from the other location. Computer simulation indicates that substantial deviations from linear performance on the part of the detector can be tolerated.

Although for the sake of clarity the invention has been described in terms of discrete power levels occurring in well-defined intervals, it will be understood that the level of power received by the detector 18 from the fiber will not fall neatly into discrete levels, because of attenuation in the fiber, scattering, and reflections from multiple discontinuities. Therefore, instead of correlating by summing the products of two sequences of clearly-defined values, correlation would in fact be performed by integrating the multiplication product of two time-dependent functions. The resulting sum of correlation functions has zero sidelobes.

It will be appreciated that the present invention is not restricted to the particular method and apparatus that have been described, and that variations may be made therein without departing from the scope of the invention as defined in the appended claims and equivalents thereof. For example, it is not essential that the sequences a, a', b, b' be formed, since it can be shown that:

$$A*A+A'*A'-B*B'-B'*B=(a*a+b*b)/2$$

and therefore a function that has zero sidelobes can be achieved by transmitting the sequences A, A', B and B', correlating the returned power with the same sequences, adding the autocorrelation functions A*A and A'*A', and subtracting the sum of the autocorrelation functions B*B and B'*B'. (Although not immediately apparent, this is equivalent to the multislit spectrometer experiment described by Golay.) Also, it is not necessary to transmit four sequences. Thus:

$$B*b+A*a-\tfrac{1}{2}[(1*a)+(1*b)]=(a*a+b*b)/2$$

This last equation implies that a function having zero sidelobes can be generated by transmitting the sequence A and correlating the returned power with the sequence a, transmitting the sequence B and correlating the returned power with the sequence b, and transmitting the sequence 1 and correlating half of the returned power with a and half with b, adding the correlation sums A*a and B*b and then subtracting the sum of the correlation sums (1*a)/2 and (1*b)/2.

It can also be shown that $$A*a-1*A+B*b-1*B+1*1=(a*a+b*b)/2$$

and therefore a function having zero sidelobes is generated by transmitting the sequence A and correlating the returned power with both a and 1, transmitting the sequence B and correlating the returned power with both b and 1, and transmitting the sequence 1 and correlating the returned power with 1.

The invention may be applied to transmission of information over a network by assigning a unique pair of Golay complementary sequences (and their logical complements) to each station. If, for example, the network has three stations P, Q and R and the Golay complementary sequences (and their logical complements) that are assigned to the stations respectively are designated p, q and r, the station P may communicate with the station Q by transmitting a message that is encoded using the sequences q. If, within a given clock period, the station Q receives the sequences q, this fact is interpreted by the station Q as a logical 1; if the station Q does not receive the sequences q, this fact is interpreted as a logical 0.

We claim:

1. A method of carrying out a measurement on a medium that propagates energy in a selected form, comprising applying power in said selected form to the medium, the level at which power is applied varying as a function of time in accordance with the elements of at least two Golay complementary sequences where one kind of element is represented by a first non-negative power level and the other kind of element is represented by a second non-negative power level and successive elements of each sequence are applied at uniform intervals, receiving power emitted in said selected form from the medium and correlating the level at which power is emitted with the level at which power was applied.

2. A method according to claim 1, wherein the level at which power is emitted from the medium is correlated with the level at which power is applied to the medium by generating derivative Golay complementary sequences in which the two kinds of elements have a positive value and a negative value respectively, and the level at which power is emitted from the medium is correlated with the derivative sequences.

3. A method according to claim 1, wherein the medium is an optical fiber having two opposite ends, and the method comprises applying optical power to the optical fiber at one end thereof and receiving optical power emitted from the fiber at said one end thereof.

4. A method according to claim 3, wherein the first power level is positive and the second power level is zero, and the method comprises varying the level at which power is applied to the optical fiber in accordance with the elements of first and second Golay complementary sequences and the logical complements of the first and second sequences, and the level at which power is emitted from the fiber is correlated with the level at which power was applied to the fiber by generating two derivative Golay complementary sequences, in which the two kinds of elements are of opposite respective polarities, from the first and second Golay complementary sequences respectively and also generating the logical complements of the two derivative Golay complementary sequences.

5. Apparatus for carrying out a measurement on a medium that propagates energy in a selected form, comprising means for applying power in said selected form to the medium, means for varying the level at which power is applied to the medium as a function of time in accordance with the elements of at least two Golay complementary sequences where one kind of element is represented by a first power level and the other kind of element is represented by a second power level and the successive elements of each series are applied at uniform intervals, means for receiving power emitted in said selected form from the medium, and means for correlating the level at which power is emitted with the level at which power was applied.

6. A method of conveying information over a medium that propagates energy in a selected form, comprising applying power in said selected form to the medium, the level at which power is applied varying as a function of time in accordance with the elements of at least two Golay complementary sequences where one kind of element is represented by a first power level and the other kind of element is represented by a second power level and the successive elements of each sequence are applied at uniform intervals, receiving power emitted in said selected form from the medium and correlating the level at which power is emitted with the level at which power was applied.

7. A method of carrying out time domain reflectometry on an optical fiber, comprising:
(a) generating first and second equally long, finite sequences of two kinds of elements such that the number of pairs of like elements with a given separation in the first sequence is equal to the number of pairs of unlike elements with the same separation in the second sequence,
(b) generating third and fourth equally long, finite sequences of two kinds of elements, the third and fourth sequences being the logical complements of the first and second sequences respectively,
(c) applying optical power to the optical fiber by way of one end thereof at a level that varies as a function of time in accordance with the first, second, third, and fourth sequences, where one kind of element is represented by a first power level and the other kind of element is represented by a second power level and the successive elements of each sequence are applied at uniform intervals,
(d) receiving optical power emitted from the fiber at said one end thereof, and
(e) correlating the level at which power is emitted from the fiber with a function that varies with time in accordance with the first, second, third, and fourth sequences, where one kind of element is represented by the function being positive and the other kind of element is represented by the function being negative.

* * * * *